US012657524B2

(12) United States Patent
Sinha et al.

(10) Patent No.: US 12,657,524 B2
(45) Date of Patent: Jun. 16, 2026

(54) JOINTLY PREDICTING MULTIPLE INDIVIDUAL-LEVEL FEATURES FROM AGGREGATE DATA

(71) Applicant: ADOBE INC., San Jose, CA (US)

(72) Inventors: Gaurav Sinha, Bangalore (IN); Vibhor Porwal, Auraiya (IN); Isha Chaudhary, New Delhi (IN); Simarpreet Singh Saluja, Mohali (IN); Rashul Chutani, Faridabad (IN); Shaurya Goel, Hisar (IN)

(73) Assignee: ADOBE INC., San Jose, CA (US)

( * ) Notice: Subject to any disclaimer, the term of this patent is extended or adjusted under 35 U.S.C. 154(b) by 1149 days.

(21) Appl. No.: 17/680,932

(22) Filed: Feb. 25, 2022

(65) Prior Publication Data

US 2023/0274310 A1 Aug. 31, 2023

(51) Int. Cl.
| | |
|---|---|
| *G06N 20/10* | (2019.01) |
| *G06F 18/213* | (2023.01) |
| *G06F 18/214* | (2023.01) |
| *G06Q 30/0242* | (2023.01) |

(52) U.S. Cl.
CPC ........... *G06N 20/10* (2019.01); *G06F 18/213* (2023.01); *G06F 18/214* (2023.01); *G06Q 30/0246* (2013.01)

(58) Field of Classification Search
CPC . G06Q 30/0246; G06F 18/214; G06F 18/213; G06N 20/10
See application file for complete search history.

(56) References Cited

U.S. PATENT DOCUMENTS

2020/0047752 A1* 2/2020 Ivanovic ............. B60W 40/072

OTHER PUBLICATIONS

NPL ALvarez Kernels for Vector Valued Functions 2012.*
NPL Emery Iterative algorithms for fitting a linear model of coregionalization 2010.*
NPL Fouedjio A fully non stationary linear coregionalization model 2017.*
NPL Gelfand Nonstationary Multivariate Process Modeling 2004.*
NPL Gourgault Multivariable Variogram and Its Application 1991.*
NPL GPFlow A simple demonstration of coregionalisation 2019.*
NPL Hofman Kernel Methods in Machine Learning 2008.*
NPL Ksenia On linear model of coregionalization 2019.*

(Continued)

*Primary Examiner* — Paul M Knight
(74) *Attorney, Agent, or Firm* — Shook Hardy & Bacon L.L.P.

(57) ABSTRACT

An analytics system jointly predicts values for multiple unobserved individual-level features using aggregate data for those features. Given a dataset, a transformation is applied to individual-level information for the dataset to generate transformed data in a higher dimensional space. Bag-wise mean embeddings are generated using the transformed data. The bag-wise mean embeddings and aggregate data for unobserved individual-level features for the dataset are used to train a model to jointly predict values for the unobserved individual-features for data instances. In particular, a given data instance can be transformed to a representation in a higher dimensional space. Given this representation, the trained model predicts values for the unobserved individual-level features for the data instance, and the data instance can be augmented with the predicted values.

15 Claims, 6 Drawing Sheets

(56) References Cited

OTHER PUBLICATIONS

NPL Laco Choosing suitable linear coregionalization models 2019.*
NPL Le Fastfood Approximate Kernel Expansions in Loglinear Time 2018.*
NPL MacNab Linear models of coregionalization 2016.*
NPL Uriot Target wise Kernel Mean Embedding in MIR.*
NPL Xing Deep Coregionalization for the Emulation of Fields 2019.*

* cited by examiner

300

302

RECEIVE INDIVIDUAL-LEVEL DATA AND AGGREGATE DATA

304

APPLY TRANSFORMATION TO INDIVIDUAL-LEVEL DATA TO GENERATED TRANSFORMED DATA IN HIGHER DIMENSIONAL SPACE

306

GENERATE MEAN EMBEDDINGS USING TRANSFORMED DATA

308

TRAIN MODEL USING MEAN EMBEDDINGS AND AGGREGATE DATA

I/O PORT(S) 618

I/O COMPONENTS 620

POWER SUPPLY 622

MEMORY 612

PROCESSOR(S) 614

PRESENTATION COMPONENT(S) 616

610

600

JOINTLY PREDICTING MULTIPLE INDIVIDUAL-LEVEL FEATURES FROM AGGREGATE DATA

BACKGROUND

The digital world has enabled the collection of vast amounts of information. While the information presents opportunities to learning meaningful insights, the sheer volume of available data presents challenges that traditional data analysis approaches are unsuitable for. This has given rise and prominence to the field of "big data," in which techniques have been developed to process and analyze large datasets. However, there are numerous situations in which data is available only at an aggregate level for a variety of reasons, such as to ensure privacy, comply with regulations, or address compute and storage costs associated with such large datasets. For instance, healthcare data, such as personal information, treatments, and outcomes, may be aggregated across a population of patients. As another example, an e-commerce company or publisher may track customer interactions on an individual level, but only share aggregates of that information with partners. While aggregate data may be suitable for some applications, in many instances, meaningful insights can only be gained from individual-level information.

SUMMARY

Embodiments of the present technology relate to, among other things, an analytics system that leverages aggregate data to jointly predict individual-level information for multiple features. In accordance with the technology described herein, a dataset with individual-level information for certain features is received. Aggregate data is also received for two or more unobserved individual-level features (i.e., features for which individual-level information is unavailable) associated with the dataset. The individual-level information is transformed to a higher dimensional space, and bag-wise mean embeddings are generated from the transformed data. The bag-wise mean embeddings and aggregate data are used to train a multi-output model.

The trained model can be used to jointly predict values for the unobserved individual-level features for data instances. Given a data instance, a transformation is applied to generate a representation of the data instance in the higher dimensional space. The representation is then provided to the trained model, which jointly predicts values for the unobserved individual-level features for the data instance. The data instance can then be augmented with the values for the unobserved individual-level features.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Definitions

Figure 1:
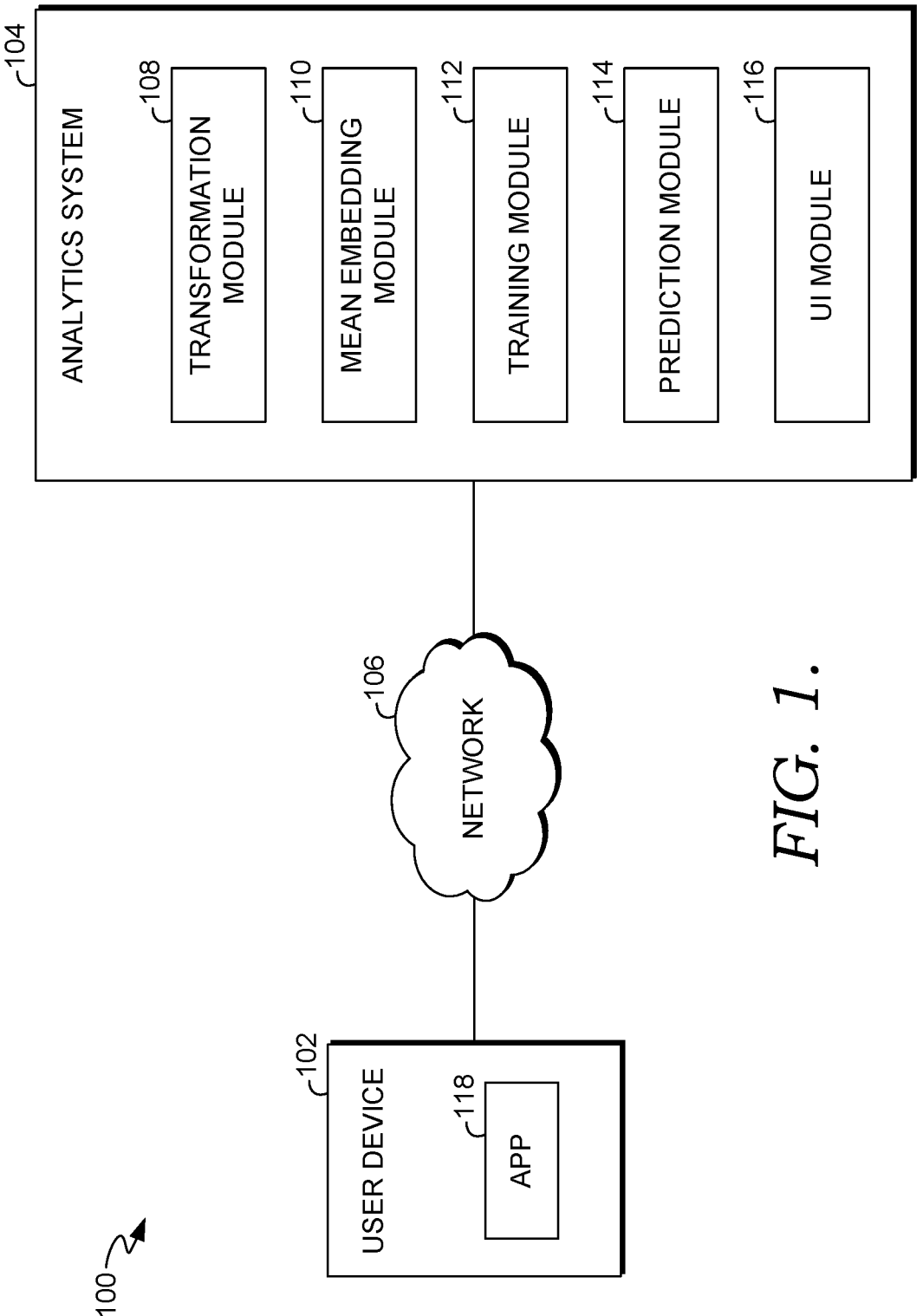
FIG. 1 is a block diagram illustrating an exemplary system in accordance with some implementations of the present disclosure.

Various terms are used throughout this description. Definitions of some terms are included below to provide a clearer understanding of the ideas disclosed herein.

As used herein, a "dataset" comprises a population of data with a plurality of data instances. Each "data instance" in a dataset comprises a collection of data with values for each of a number of features. Each feature having a value for each data instance is referred to herein as an "individual-level feature." By way of illustration, Table 1 below provides an example dataset. Each column in the dataset corresponds with an individual-level feature, such as the "state", "browser", and "product viewed" features. Each row in the dataset corresponds with a data instance with a value for each individual-level feature.

TABLE 1

| Example Dataset | | | | |
| --- | --- | --- | --- | --- |
| timestamp | user id | state | browser | product viewed |
| Jan. 1, 2021 12:00 | 1 | CA | chrome | phone |
| Jan. 1, 2021 16:13 | 7 | NY | internet explorer | none |
| ... | ... | ... | ... | ... |
| Jan. 31, 2021 17:42 | 1 | CA | chrome | furniture |

As used herein, an "unobserved individual-level feature" is a feature for which data is not available for individual data instances, although data can be available at an aggregate level for the feature.

"Aggregate data" refers to data that is available for a feature as an aggregate over data instances in a dataset. In some instances, the aggregate data for a feature is aggregated over values of another feature of the dataset (referred to herein as an "aggregation feature"). By way of illustration, Table 2 below provides an example of aggregate data corresponding with the dataset of Table 1. Aggregate data is available for two features: "ad impressions" and "ad clicks". Each of these two features correspond with an unobserved individual-level feature in the case that the dataset does not provide data at the individual data instance level for each feature. In the example of Table 2, the aggregate data is aggregated over values of the "state" feature, such that an aggregate value is provided for each state for each of the ad impressions and ad clicks features.

TABLE 2

| | Example Aggregate Data | |
| --- | --- | --- |
| state | number of ad impressions | number of ad clicks |
| CA | 13425 | 1212 |
| ... | ... | ... |
| NY | 22478 | 2245 |

As used herein, "transformed data" comprises a representation of a data instance in which at least a portion of the values for individual-level features of the data instance have been transformed to a higher dimensional space. In some instances, the transformation is performed using a kernel, such as the Fastfood kernel.

A "mean embedding" refers to a computed empirical estimate of a mean kernel embedding. In accordance with aspects of the technology described herein, bag-wise mean embeddings can be generated using transformed data generated from a dataset. Each bag corresponds with a value of the individual-level feature over which the aggregate data is aggregated. For instance, continuing the example of Table 2 in which the aggregate data has been aggregated over the "state" individual-level feature, each bag for generating mean embeddings can correspond with a state such that a mean embedding is generated for each state.

Overview

With the massive growth in big data based technologies, there is an increased demand for sharing of data across, as well as within, organizations. Due to multiple reasons such as privacy, storage and compute costs, data that is shared is often aggregated at an appropriate level. For instance, consider an e-commerce company which tracks customer interactions on its own website (e.g., Table 1 above) but also obtains the number of ad impressions and ad clicks per state (e.g., Table 2 above) from a publisher. To not reveal private click behavior, the publisher might not allow any further granular information, thereby limiting the usage of this data only to state level models and insights. While the aggregate data might be suitable for obtaining high level insights, getting individual level information corresponding to these aggregates could be far more valuable.

A number of existing approaches have been proposed for determining individual level information from aggregate data. Ecological inference is the problem of understanding individual behavior from aggregate data and has been widely studied in the social sciences literature. One existing approach to solve the ecological inference problem uses a technique called Distribution Regression. However, the method only deals with one aggregated label (Single Task Learning) at a time and does not simultaneously use the dependencies between multiple aggregated labels.

Another existing approach, Learning from Label Proportions (LLP), is related to the ecological inference problem with the difference that in LLP, the goal specifically is to learn a classifier on individual instances (with labels aggregated over bags), while the ecological inference problem can be more general. A number of existing technologies have been developed to target the LLP problem. However, none of these existing techniques address the problem of improving the performance using joint disaggregation of multiple labels.

Another line of existing techniques considers multi-task learning with spatial aggregation instead of bag level label aggregation (e.g., aggregation on discrete columns). While the approaches address a similar problem, the techniques focuses on spatial aggregation making it difficult to apply in the current setting.

Embodiments of the present technology solve these problems by providing an analytics system that leverages aggregate data to jointly predict values for multiple unobserved individual-level features for individual data instances. At a high level, aspects of the technology described herein use a dataset with individual-level information and aggregate data associated with the dataset to train a multi-output model. The trained model can then be used to jointly predict values for unobserved individual-level features for data instances.

For instance, consider the example of Tables 1 and 2 in which a dataset with individual-level information is available for multiple features and aggregate data is available for two unobserved individual-level features: ad impressions and ad clicks. Given this data, aspects of the technology described herein can be employed to train a multi-output model to jointly predict values for the ad impression and ad click features for each data instance. Those values can then be used to augment the dataset, for instance as shown in Table 3 below in which a value of "True" or "False" has been predicted for each data instance and added to the dataset.

TABLE 3

| | Augmented Dataset | | | | | |
| --- | --- | --- | --- | --- | --- | --- |
| timestamp | user id | state | browser | product viewed | ad impression | ad click |
| Jan. 1, 2021 12:00 | 1 | CA | chrome | phone | True | True |
| Jan. 1, 2021 16:13 | 7 | NY | internet explorer | none | True | False |
| ... | ... | ... | ... | ... | ... | ... |
| Jan. 31, 2021 17:42 | 1 | CA | chrome | furniture | False | False |

To train a model in accordance with some aspects of the technology described herein, a transformation is applied to values for individual-level features from a dataset to generate transformed data for each data instance in a higher dimensional space. For instance, as kernel, such as a Fastfood kernel, can be used to transform each data instance to a higher dimensional space. The transformed data is then used to generate bag-wise mean embeddings. Each bag can correspond with a value of a feature from the dataset over which aggregate data is aggregated. For instance, in the example of Tables 1 and 2, each bag corresponds with a state value of the "state" feature, thereby providing a mean embedding for each state.

The mean embeddings and aggregate data are used to train a multi-output model (i.e., regressor), which can be based on a Linear Model of Co-regionalization (LMC). The trained model can then be used to predict values for unobserved individual-level features for data instances. To predict values for a given data instance, a transformation, such as a Fastfood kernel, is applied to the data instance to provide a representation of the data instance in the higher dimensional space. The representation of the data instance in the higher dimensional space is provided to the trained model, which jointly predicts values for multiple unobserved individual-level features. The predicted values can then be used to augment the data instance in the dataset.

The technology described herein provides a number of advantages over existing approaches. For instance, by capturing inter-task relationships (even with the aggregate data), a trained model generated using the technology described herein performs better than prior works that focus on disaggregating only one label at a time. The techniques described herein provide for joint disaggregation of multiple aggregated features in a way that both disaggregations share information and help each other. As will be described in further detail below, experiments on two real datasets were conducted demonstrating that joint disaggregation of the technology described herein leads to more accurate predictions compared to applying other techniques separately to each aggregated label.

Example System for Predicting Individual-Level Features

With reference now to the drawings, FIG. 1 is a block diagram illustrating an exemplary system 100 for predicting individual-level features given aggregate data in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an analytics system 104. Each of the user device 102 and analytics system 104 shown in FIG. 1 can comprise one or more computer devices, such as the computing device 600 of FIG. 6, discussed below. As shown in FIG. 1, the user device 102 and the analytics system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and servers can be employed within the system 100 within the scope of the present technology. Each can comprise a single device or multiple devices cooperating in a distributed environment. For instance, the analytics system 104 could be provided by multiple server devices collectively providing the functionality of the analytics system 104 as described herein. Additionally, other components not shown can also be included within the network environment.

At a high level, given a dataset with individual-level data for certain features and aggregate data for multiple unobserved individual-level features, the analytics system 104 trains a model to predict values for each of the unobserved individual-level features. As shown in FIG. 1, the analytics system 104 includes a transformation module 108, a mean embedding module 110, a training module 112, a prediction module 114, and a user interface (UI) module 116. These components can be in addition to other components that provide further additional functions beyond the features described herein.

The analytics system 104 can be implemented using one or more server devices, one or more platforms with corresponding application programming interfaces, cloud infrastructure, and the like. While the analytics system 104 is shown separate from the user device 102 in the configuration of FIG. 1, it should be understood that in other configurations, some or all of the functions of the treatment effect system 104 can be provided on the user device 102.

The analytics system 104 operates on inputs that include a dataset that provides values for individual-level features for a number of data instances. For instance, Table 1 (reproduced below) presents an example dataset in which each column is an individual-level feature and each row is a data instance with a value for each individual-level feature. Accordingly, let $X_1, X_2, \ldots, X_n$ (called individual-level features) denote a set of observed random variables defined at the individual level i.e. $X_i : \Omega \Rightarrow C_i$, where $\Omega$ is the population sample space and $C_i$ denotes the range of values $X_i$ can take (finite or infinite).

TABLE 1

| Example Dataset | | | | |
| --- | --- | --- | --- | --- |
| timestamp | user id | state | browser | product viewed |
| Jan. 1, 2021 12:00 | 1 | CA | chrome | phone |
| Jan. 1, 2021 16:13 | 7 | NY | internet explorer | none |
| ... | ... | ... | ... | ... |
| Jan. 31, 2021 17:42 | 1 | CA | chrome | furniture |

The goal of the analytics system 104 is to predict values for unobserved individual-level features for which only aggregate data is available. For instance, Table 2 (reproduced below) presents aggregate data for two unobserved individual-level features in which the data is aggregated for the population for each of the two features, "ad impressions" and "ad clicks". Additionally, the data in FIG. 2 has been aggregated over a particular aggregation feature. In particular, the data has been aggregated by state such that there is an aggregate value for each state for each of the two features.

TABLE 2

| Aggregate data | | |
| --- | --- | --- |
| state | number of ad impressions | number of ad clicks |
| CA | 13425 | 1212 |
| ... | ... | ... |
| NY | 22478 | 2245 |

Accordingly, let $Y_1$, $Y_2$ (called unobserved individual-level features) be unobserved random variables on the same population. $C_1$ is assumed to be finite and the analytics system 104 is also given access to aggregate data over the unobserved individual-level features, i.e., variables $Z_1$, $Z_2$:$C_1 \rightarrow \mathbb{R}$ defined as $$Z_j = \mathbb{E}[Y_j | X_1]$$

Using $X_1, \ldots, X_m$ and $Z_1$, $Z_2$, the analytics system 104 computes point-wise estimates $\hat{Y}_1$, $\hat{Y}_2$ of $Y_1$, $Y_2$ respectively. Note that for simplicity, examples discussed herein only include two unobserved individual-level features $Y_1$, $Y_2$ and only one aggregation feature $X_1$. However, the techniques described herein can be used with many hidden variables and/or multiple aggregation features.

Given the dataset with values for individual-level features, the transformation module 108 generates transformed data by transforming the values for individual-level features from the dataset to a higher dimensional space. For instance, in some configurations, the transformation module 108 uses a kernel, such as the Fastfood kernel, to transform values of individual-level features of a dataset to transformed data in a higher dimensional space. In some instances, the transformation can be applied to each individual-level feature except for an aggregation feature over which aggregate data for the dataset has been aggregated. For instance, the aggregate data in Table 2 has been aggregated over the "state" feature such that aggregate data is available for each value of the "state" feature. As such, the transformation can be applied to the values for the other individual-level features.

Accordingly, the transformation module 108 transforms the individual level features $X = \{X_2, \ldots, X_n\}$ using a transformation, such as a Fastfood kernel. In the example provided herein, $X_1$ is the aggregation feature—i.e., individual-level feature over which aggregate data is available (e.g., the "state" individual-level feature in the example of Table 2). If $\phi$ is a Gaussian RBF kernel, the transformation computes a d-dimensional approximation $\hat{\phi}(x) \in \mathbb{R}^d$ of $\phi(x)$ for every x~X. The transformation module 108 thus transforms a data instance $\{x_1, \ldots, x_n\}$ from the dataset to transformed data $\{x_1, \hat{\phi}(\{x_2, \ldots, x_n-1\})\}$.

The mean embedding module 110 generates bag-wise mean embeddings using the transformed data from the transformation module 108. Each bag corresponds with a value of the individual-level feature over which the aggregate data is aggregated. For instance, continuing the example of Table 2 in which the aggregate data has been aggregated over the "state" feature, each bag corresponds with a state such that a mean embedding is generated for each state. Accordingly, for each distinct value s of $X_1$, the mean embedding module 110 computes a mean embedding, $$\mu_s = \sum_{X_1 = s} \hat{\phi}(\{X_2^j, \ldots, X_n^j\}).$$

Here, the sum is over the rows of the dataset with $$X_1 = s, X_i^j,$$

the value of the feature $X_i$ in $j^{th}$ row. $\hat{\mu}(s)$ is the computed empirical estimate of the mean kernel embedding $\mu_s$ at $X_1 = s$.

The mean embeddings from the mean embedding module 110 along with the aggregate data (i.e., estimated label proportions $\widehat{Z_1}(s)$, $\widehat{Z_2}(s)$ (of $Z_1(s)$, $Z_2(s)$ respectively) are passed to the training module 112 to train a multi-output Gaussian model to predict values for unobserved individual-level features. Some configurations employ a Linear Model of Coregionalization (LMC) as the multi-output Gaussian process. The following provides a description of LMC and how it is used in the technology described herein. LMC is a generative multi-output Gaussian process modelling approach. In this, the prediction functions are linear combinations of $R_q$ independent samples from Q independent Gaussian processes. Let $u^1(x)$, $u^2(x)$, . . . , $u^{R_q}(x)$ be the independent samples from the $q^{th}$ Gaussian function. Linear combination of them will give the $d^{th}$ output for the multi-task model as in equation (1) below:

$$f_d(x) = \sum_{q=1}^{Q} \sum_{i=1}^{R_q} a_{d,q}^i u_q^i(x) \tag{1}$$

The covariance between the Gaussian function samples evaluated at different inputs, x, x' is as follows:

$$cov\left(u_q^i(x), u_q^i(x')\right) = k(x, x') \tag{2}$$

where k(x, x') is kernel function applied to x and x'. Thus, the covariance of the (zero-mean) predictor function is given in equation (3) below:

$$cov(f(x), f(x')) = \sum_{q=1}^{Q} A_q A_q^T k_q(x, x') = \sum_{q=1}^{Q} B_q k_q(x, x') \tag{3}$$

where $$A_q = \left[a_q^1, a_q^2, \ldots, a_q^{R_q}\right].$$

Here, the rank of $B_q$ is $R_q$, and $B_q$ are called the coregionalization matrices. All the outputs can be accumulated to form the entire multi-output predictor function as shown below by equation (4):

$$f(x) = \begin{bmatrix} f_1(x) \\ f_2(x) \\ \cdot \\ \cdot \\ \cdot \\ f_D(x) \end{bmatrix} \sim \mathcal{N}\left(\begin{bmatrix} 0 \\ 0 \\ \cdot \\ \cdot \\ \cdot \\ 0 \end{bmatrix}, \sum_{q=1}^{Q} B_q \otimes K_q\right) = \mathcal{N}(0, K_{f,f}) \tag{4}$$

Here, $K_{f,f}$ is the covariance matrix for function f with itself. The observation model, which is the prediction model with additional independent zero-mean noise, with standard deviation $\sigma$, is given in equation (5) below:

$$y(x) = \begin{bmatrix} y_1(x) \\ y_2(x) \\ \cdot \\ \cdot \\ \cdot \\ y_D(x) \end{bmatrix} \sim \mathcal{N}\left(\begin{bmatrix} 0 \\ 0 \\ \cdot \\ \cdot \\ \cdot \\ 0 \end{bmatrix}, \sum_{q=1}^{Q} B_q \otimes K_q + \sigma^2 I\right) = \mathcal{N}\left(0, K_{f,f} + \sum\right) \tag{5}$$

US 12,657,524 B2

9
10

The noise in the observation model ensures that the outputs of the LMC model are related. If the model outputs are assumed to be noise-free, then they are learnt independently. This condition is known as Autokrigeability.

The training module 112 uses the mean embeddings from the mean embedding module 110 and the aggregate data to train the LMC model. For instance, continuing the example in which there are two unobserved individual-level features (D=2), the data given for training the LMC model is of the form $\mathcal{D} = (\hat{\mu}(s), \hat{Z}_1(s), \hat{Z}_2(s))$ as defined above. The observed label outcomes are $y_1(\hat{\mu}(s))=\hat{Z}_1(s)$ and $y_2(\hat{\mu}(s))=\hat{Z}_2(s)$. The LMC model is trained using the above information and its hyperparameters are tuned. The hyperparameters for the LMC model are the coefficients of the coregionalization matrix $B_q$, the variables in the kernel functions and the covariance of the noise in the observation model, $\sigma$.

The prediction module 114 uses the trained model from the training module 112 to jointly predict values for multiple unobserved individual-level features for data instances.

Given a data instance, a transformation, such as a Fastfood kernel is applied to the data instance to provide a representation of the data instance in a higher dimensional space. Using this representation as input, the trained model jointly generates a predicted value for each unobserved individual-level feature for the data instance. The data instance can then be augmented by adding the predicted value for each unobserved individual-level feature to the data instance.

Accordingly, for prediction, given a representation of a data instance in a high dimensional space, $$\mu_s^*,$$

the output of the model $$y^* = y(\mu_s^*) = [y_1(\mu_s^*), y_2(\mu_s^*)]^T$$

has the distribution given in equation (6):

$$p(Y_*|y,\mu_s,\theta)=\mathcal{N}(y_*|\mu_*,K_{y*,y*}) \quad (6)$$

where $$\mu_* = K_{f_*,f}(K_{f,f} + \Sigma)^{-1}y$$
$$K_{y_*,y_*}=K_{f_*,f_*} - K_{f_*,f}(K_{f,f} + \Sigma)^{-1}K_{f_*,f}^T + \Sigma_*$$

are the mean and covariance of $y_*$ respectively.

$$f_* = f(\mu_s^*)$$

(See equation (4) above). $K_{f_*,f}$ and $K_{f_*,f_*}$ are the covariance of $f_*$ and f and that of $f_*$ with itself, respectively. To enable individual-level prediction, no aggregation is done. Therefore, $\mu_s^*$ signifies one data instance, which was passed through a transformation (e.g., a Fastfood kernel) and underwent no mean operation.

For illustration purposes, Table 3 below provides an example of the dataset of Table 1, which has been augmented with predicted values for two unobserved individual-level features. Given the initial dataset of Table 1 and augmented data of Table 2, a model can be trained to jointly predict values for the unobserved individual-level features, ad impression and ad click, each data instance of the dataset. Those predicted values can then be added to the initial dataset to generate the augmented dataset of Table 3.

TABLE 3

| | | | | | | |
|---|---|---|---|---|---|---|
| Augmented Dataset | | | | | | |
| timestamp | user id | state | browser | product viewed | ad impression | ad click |
| Jan. 1, 2021 12:00 | 1 | CA | chrome | phone | True | True |
| Jan. 1, 2021 16:13 | 7 | NY | internet explorer | none | True | False |
| ... Jan. 31, 2021 17:42 | ... 1 | ... CA | ... chrome | ... furniture | ... False | ... False |

The user interface (UI) module 116 of the analytics system 104 provides one or more user interfaces for interacting with the system. For instance, the UI module 112 can provide user interfaces to a user device, such as the user device 102. The user device 102 can be any type of computing device, such as, for instance, a personal computer (PC), tablet computer, desktop computer, mobile device, or any other suitable device having one or more processors. As shown in FIG. 1, the user device 102 includes an application 118 for interacting with the analytics system 104. The application 118 can be, for instance, a web browser or a dedicated application for providing functions, such as those described herein. Among other things, the application 118 can present the user interfaces provided by the UI module 116.

Figure 2:
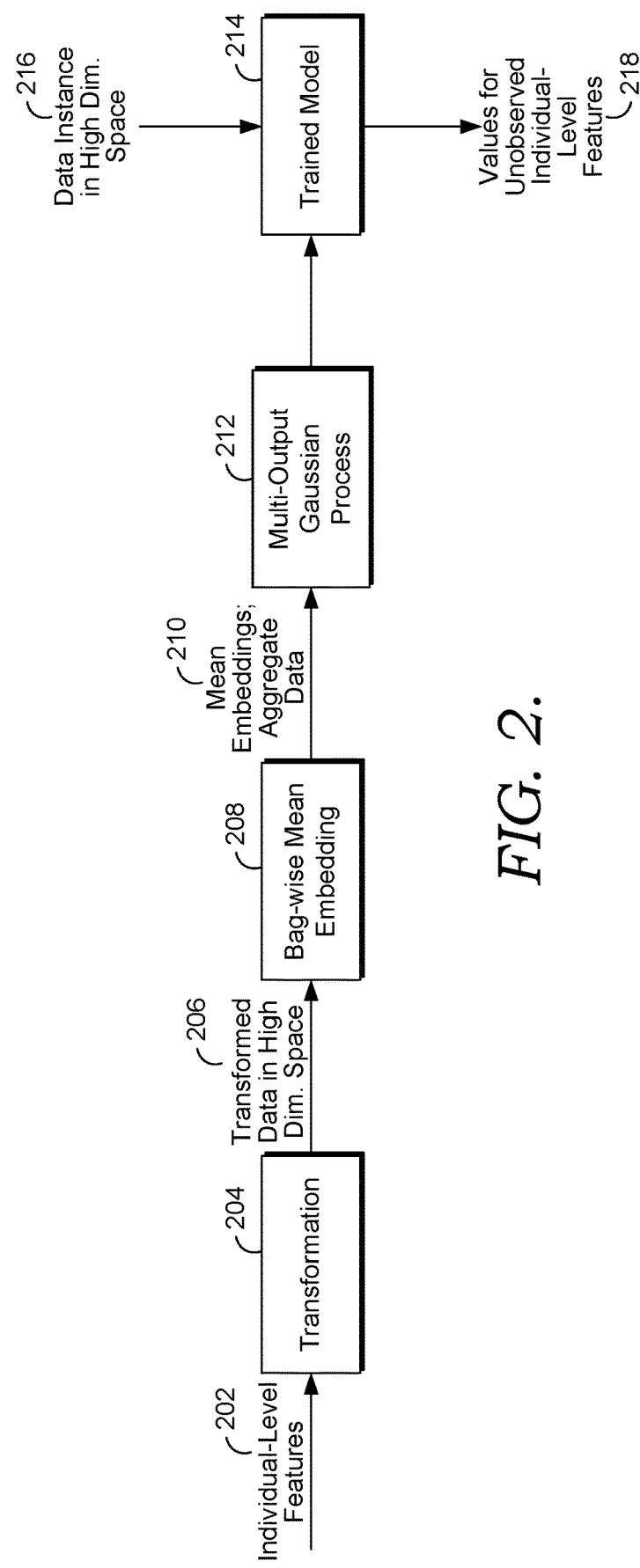
FIG. 2 is a diagram an overall process of predicting individual-level features from aggregate data in accordance with some implementations of the present disclosure.

Turning now to FIG. 2, a block diagram is presented that illustrates an overall process for predicting values for individual-level features, which can be performed, for instance, by the analytics system 104 of FIG. 1. As shown in FIG. 2, a transformation 204 is applied to values for individual-level features 202 from a dataset. The transformation 204 converts the values for the individual-level features 202 to transformed data 206 in a higher dimensional space. For instance, as noted above, the transformation 204 can comprise a kernel, such as the Fastfood kernel.

Bag-wise mean embedding 208 is applied to the transformed data 206. As discussed above, each bag corresponds to a distinct value of an aggregation feature over which aggregate data associated with the dataset was aggregated. For instance, in the example of Tables 1 and 2, each bag corresponds with a particular state for the state variable, such that a mean embedding is generated for each state. For example, a mean embedding would be generated for California, based on transformed data for data instances having California as the value for the "state" individual-level feature.

The mean embeddings and aggregate data 210 are provided to a multi-output Gaussian process 212. The aggregate data comprises aggregate-level data for unobserved individual-level features for the dataset. As noted above, the aggregate data is aggregated over the aggregation feature used for the bag-wise mean embedding 208. For instance, continuing the example of Tables 1 and 2, the aggregate data is provided for each state value for the "state" feature. The mean embeddings and aggregate data 210 are used to train a model, such as an LMC model, providing a trained model 214.

The trained model 214 is in turn used to jointly predict values for two or more unobserved individual-level features. As shown in FIG. 2, a data instance in a higher dimensional space 216 is provided by applying a transformation, such as a Fastfood kernel, to the data instance. The data instance in the higher dimensional space 216 is provided to the trained model 214, which jointly predicts values for multiple unobserved individual-level features 218. The data instance is then augmented using the predicted values.

Example Methods for Predicting Individual-Level Features

Figure 3:
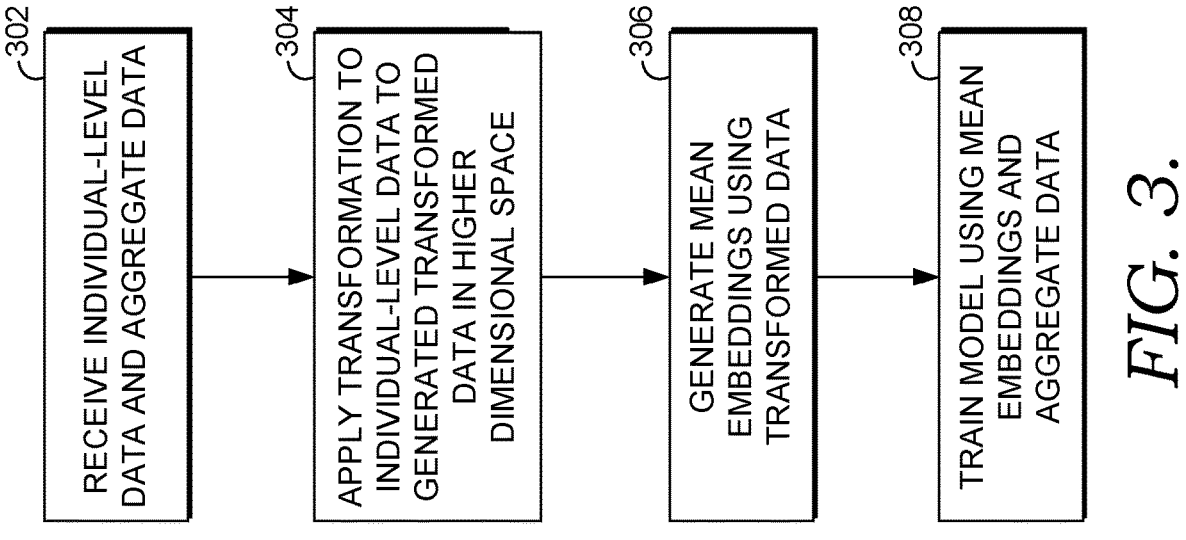
FIG. 3 is a flow diagram showing a method for generating a model for predicting individual-level features from aggregate data in accordance with some implementations of the present disclosure.
Figure 3:

With reference now to FIG. 3, a flow diagram is provided that illustrates a method 300 for generating a model for predicting individual-level features from aggregate data. The method 300 can be performed, for instance, by the analytics system 104 of FIG. 1. Each block of the method 300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 302, individual level data from a dataset and aggregate data associated with the dataset are received. The individual level data of the dataset comprises data instances that each include values for a number of individual-level features. The aggregate data comprises aggregated data values for multiple unobserved individual-level features for the population of data in the dataset.

A transformation is applied to the individual-level data, as shown at block 304. For instance, the transformation can comprise a kernel, such as a Fastfood kernel. This generates transformed data at a higher dimensional space.

Bag-wise mean embeddings are generated from the transformed data, as shown at block 306. Each bag for the bag-wise mean embedding can correspond to each distinct value of an individual-level feature of the dataset. For instance, in the example of Tables 1 and 2 from above, a mean embedding is generated for each state for the "state" feature. These can correspond to the feature over which the aggregate data was aggregated. For instance, as shown in Table 2, the aggregate data was aggregated over the "state" feature, such that an aggregate value is provided for each state.

The bag-wise mean embeddings and the aggregate data are used to train a multi-output model, as shown at block 308. As noted above, the model can comprise an LMC model, which is trained by tuning hyperparameters, including the coefficients of the coregionalization matrix $B_q$, the variables in the kernel functions and the covariance of the noise in the observation model, $\sigma$. This provides a trained model that can be used to jointly predict values for unobserved individual-level features.

Figure 4:
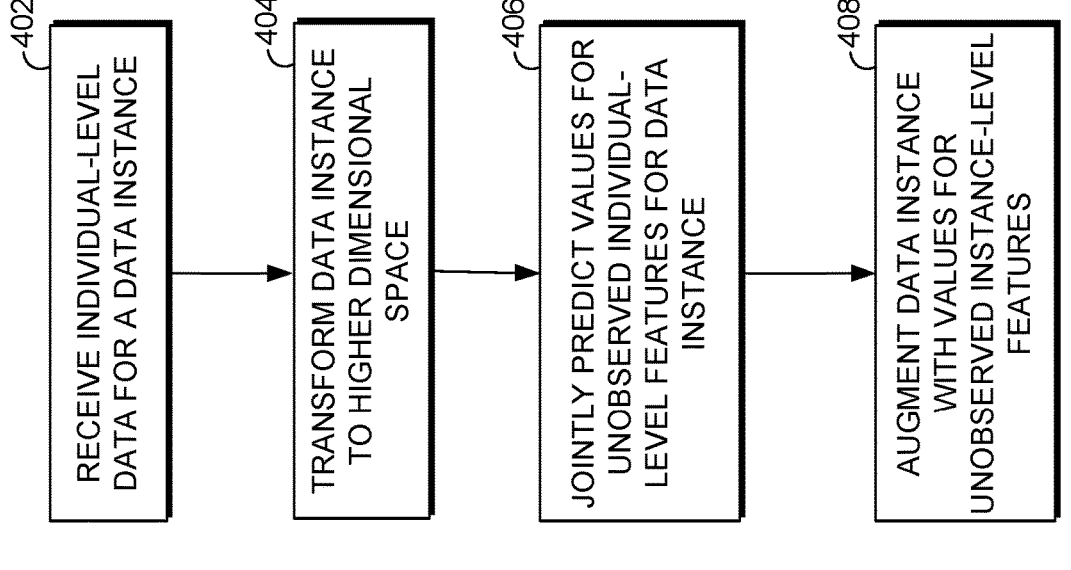
FIG. 4 is a flow diagram showing a method for using a trained model to jointly predict values for multiple individual-level features for a data instance in accordance with some implementations of the present disclosure.

Turning next to FIG. 4, a flow diagrams is provided that illustrates a method 400 for using a trained model (e.g., a model generated using the method 300 of FIG. 3) to jointly predict values for multiple individual-level features for a data instance. As shown at block 402, individual-level data for a data instance is received. The individual-level data for the data instance comprises a value for each of a number of individual-level features. A transformation is applied to the individual-level data, as shown at block 404. The transformation can comprise a kernel, such as a Fastfood kernel. This generates a representation of the data instance at a higher dimensional space.

The transformed data for the data instance is provided to a trained model (e.g., a model trained using the method 300 of FIG. 3), as shown at block 406. Given the transformed data, the trained model jointly generates predicted values for multiple unobserved individual-level features for the data instance. The data instance is augmented with the predicted values, as shown at block 408.

Performance Evaluation

Experiments were performed on two datasets to assess the performance of techniques described herein. The first dataset is the open dataset MNIST, and the second dataset comprises customer journeys of visitors of adobe.com curated by stitching hit level data corresponding to their interactions. The technology described herein was compared with a single task learning (STL) approach based on distribution regression. Before discussing the comparisons, the following describes the features and task labels created for both the datasets.

MNIST dataset design: MNIST handwritten digits dataset with 60,000 training samples and 10,000 test samples was taken from PyTorch preloaded datasets. Its input features are 28×28 grayscale images of handwritten digits from 0 to 9, which are labelled with the digit in the respective figure. The input features were flattened into 1D arrays of 784 elements for each sample. To create two binary classification tasks from this MNIST dataset, the samples were split as follows. The first task a.k.a. 01234 was created by using a task label indicating 1 for all samples which are labelled either '0', '1', '2', '3' or '4' and 0 for the remaining samples in the training as well as the test dataset. The second task a.k.a. 12345 was created by using a task label indicating 1 for all samples which are labelled either '1', '2', '3', '4' or '5' and 0 for the remaining samples in the training as well as the test dataset. These two task labels have 0.62 Pearson correlation in the training dataset. To aggregate the labels, bags of size 100 were created. These were chosen randomly and the above labels were aggregated on each bag to create the final bag level labels.

Adobe hit level dataset design: Hit level data of customers visiting adobe.com during a month was used. The journeys were stitched using their member id. The two task labels in this case are: (a) binary label indicating whether customer purchases or not; and (b) their member status indicating their status which can be one of {paid, paid-org, free, none, not-entitled}. In order to simplify the task and only consider a binary label, label value 0 was for {paid, paid-org, free} and 1 was used for {none, not-entitled}. The features comprise other hit level attributes and behaviors of the visitors like geo, browser, number of product list adds etc. For this dataset, aggregates of the two labels were created by bagging customers using their state i.e. aggregation is at state level.

13

TABLE 4

| | | | AUC results for STL and MTL | |
|---|---|---|---|---|
| Dataset | Bagging | Label | STL (baseline) | MTL |
| Adobe | By state | number of purchases | 0.81 | 0.82 |
| | | member status | 0.81 | 0.85 |
| MNIST | Uniform | 01234 | 0.90 | 0.91 |
| | (100) | 12345 | 0.91 | 0.92 |

Table 4 present AUC results for the baseline STL approach and the multi-task learning (MTL) approach of the technology described herein. As can be seen from Table 4, for both datasets, our MTL model performs better than the STL model since it models intertask relationships. This is demonstrated by higher AUC metric achieved on both the labels using the MTL model. Linear and Bias were used as kernels for the Adobe dataset, and Polynomial and Bias were used for MNIST dataset.

Figure 5:
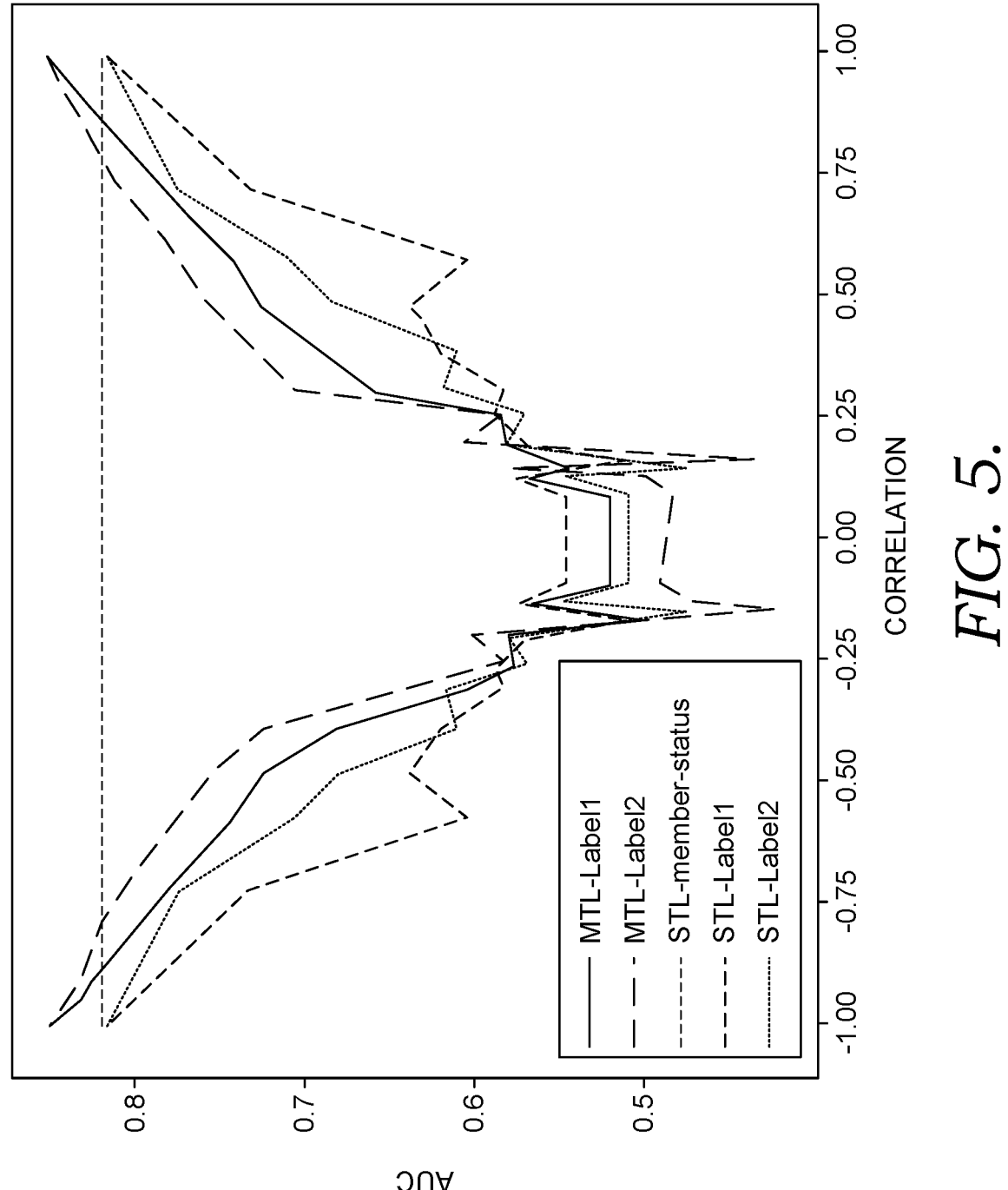
FIG. 5 is a plot that compares performance of an multi-task learning model using the technology described herein with a baseline single task learning model.

Performance on varying correlation: Another simulated experiment was performed to assess how the performance of the MTL model of the technology described herein and the baseline STL model changes with respect to correlation between the tasks. The 'member_status' column was cloned into two identical columns, say $C_1$ and $C_2$. Random Gaussian noise (with mean 0.3 and standard deviation $\sigma$) was added to $C_1$, and a similar Gaussian noise was subtracted from $C_2$. Final labels $L_1$, $L_2$ were created by thresholding $C_1$, $C_2$ (respectively) at 0.5. Another column $C_3$ was created as the complement of $C_2$. By varying the standard deviation a of the Gaussian noise (from 0 to 1.2 in steps of 0.1), the correlation was varied between pairs $(C_1, C_2)$ and $(C_1, C_3)$ giving a range of correlations from −1 to 1. The tasks defined by these new label pairs were fed into the MTL model of the technology described herein and the baseline STL model. FIG. 5 is a plot showing the AUC trends observed on the test dataset.

In FIG. 5, the curves with keys MTL-Label1 and MTL-Label2 plot the AUCs of the outputs of the MTL model using the technology described herein, and the curves with keys STL-Label1 and STL-Label2 plot the AUCs obtained from the STL (distribution regression) model. As can be seen from FIG. 5, the MTL model outperforms the STL baseline at all task correlation values other than correlations very close to zero-correlation. The curved with key STL-member-status denotes the AUC on test data observed when no change is made to the label column; i.e., it is the actual real data AUC in Table 4.

Exemplary Operating Environment

Figure 6:
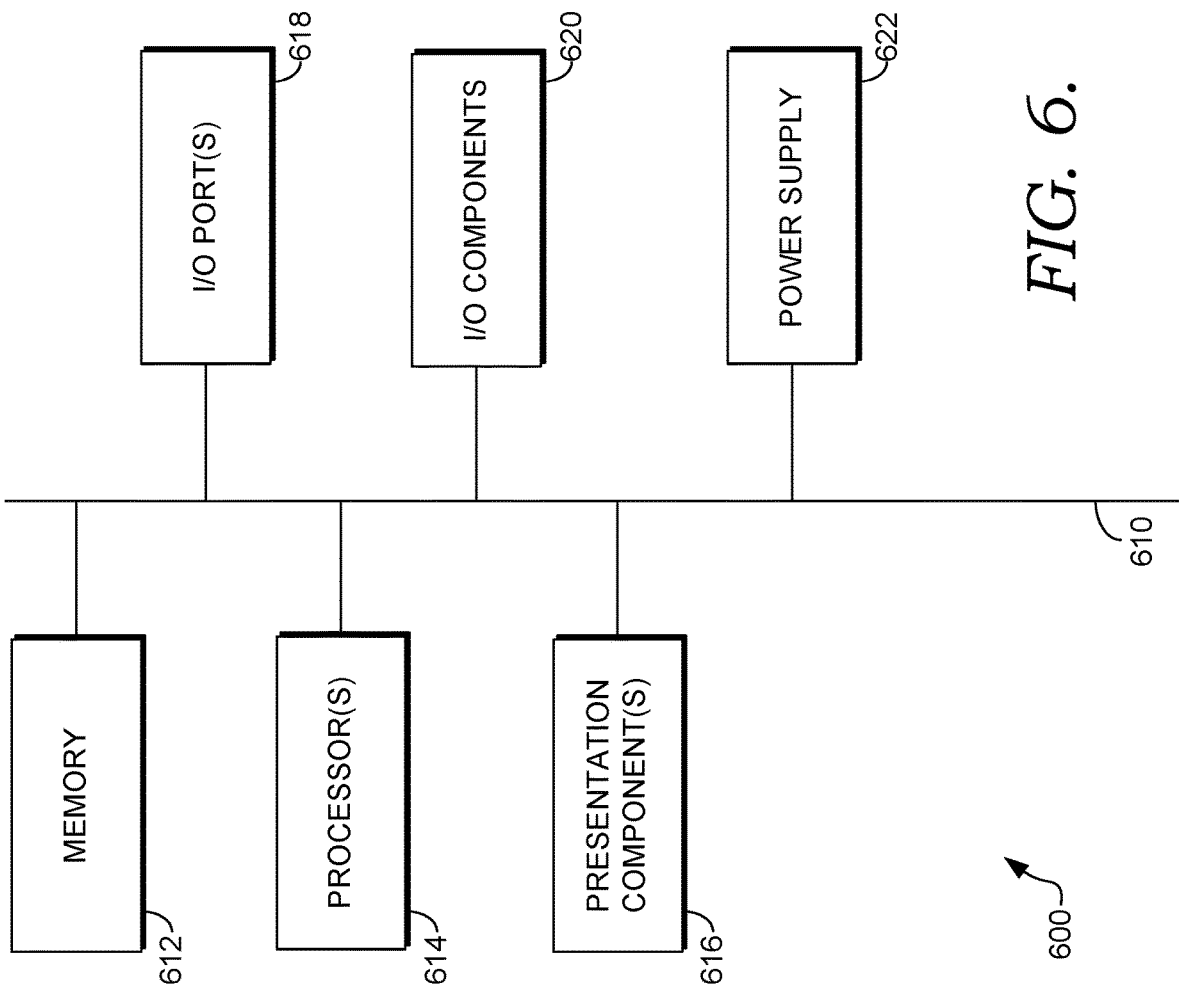
FIG. 6 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 6 in particular, an exemplary operating environment for implementing embodiments of the present technology is shown and designated generally as computing device 600. Computing device 600 is but one example of a suitable computing environment and is not intended to suggest any limitation as to the scope of use or functionality of the technology described herein. Neither should the computing device 600 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what can be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 6 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile and/or nonvolatile memory. The memory can be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which can be built in. Illustrative components include a microphone, joystick, game pad, satellite dish, scanner, printer, wireless device, etc. The I/O components 620 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 600. The computing device 600 can be equipped with depth cameras, such as, stereoscopic camera systems, infrared camera systems, RGB camera systems, and combinations of these for gesture detection and recognition. Additionally, the computing device 600 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that the technology described herein is well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

accessing, by at least one of one or more servers of an analytics system, a dataset stored on a computer storage device accessible to the analytics system;

transforming, by at least one of the one or more servers of the analytics system, values of individual-level features of each data instance of the dataset to generate transformed data in a higher dimensional space for each data instance;

for each distinct value of a first individual-level feature, generating, by at least one of the one or more servers of the analytics system, a mean embedding using the transformed data;

training, by at least one of the one or more servers of the analytics system, a Linear Model of Coregionalization (LMC) model using the mean embeddings and aggregate data for the dataset for each of two or more unobserved individual-level features;

providing, by at least one of the one or more servers of the analytics system, transformed data for a first data instance as input to the trained LMC model;

determining, by at least one of the one or more servers of the analytics system using the trained LMC model, a value for each of the two or more unobserved individual-level features for the first data instance based on the transformed data for the first data instance; and augmenting, by at least one of the one or more servers of the analytics system, the dataset stored on the computer storage device by updating the first data instance with the value for each of the two or more unobserved individual-level features.

2. The computer storage media of claim 1, wherein the values of the individual-level features of each data instance are transformed to generate the transformed data using a Fastfood kernel.

3. The computer storage media of claim 1, wherein the aggregate data is aggregated over each distinct value of the first individual-level feature.

4. The computer storage media of claim 1, wherein training the LMC model comprises tuning hyperparameters of the LMC model.

5. The computer storage media of claim 4, wherein the hyperparameters of the LMC model comprise coefficients of a coregionalization matrix, variables in kernel functions, and a covariance of noise.

6. The computer storage media of claim 1, wherein the first data instance is from the dataset.

7. A computerized method comprising:

accessing, by at least one of one or more servers of an analytics system, a dataset stored on a computer storage device accessible to the analytics system;

transforming, by at least one of the one or more servers of the analytics system, values of individual-level features of each data instance of the dataset to transformed data in a higher dimensional space for each data instance;

for each distinct value of a first individual-level feature, generating, by at least one of the one or more servers of the analytics system, a mean embedding using the transformed data;

training, by at least one of the one or more servers of the analytics system, a Linear Model of Coregionalization (LMC) model using the mean embeddings and aggregate data for the dataset to predict two or more unobserved individual-level features;

jointly predicting, by at least one of the one or more servers of the analytics system using the trained LMC model, a value for each of the two or more unobserved individual-level features for a first data instance; and augmenting, by at least one of the one or more servers of the analytics system, the dataset stored on the computer storage device by updating the first data instance with the value for each of the two or more unobserved individual-level features.

8. The method of claim 7, wherein jointly predicting the value for each of the two or more unobserved individual-level features for the first data instance comprises:

generating, from the first data instance, transformed data in the higher dimensional space; and providing the transformed data for the first data instance as input to the trained LMC model.

9. The method of claim 7, wherein the values of the individual-level features of each data instance of the dataset are transformed to generate the transformed data using a Fastfood kernel.

10. The method of claim 7, wherein the aggregate data is aggregated over each distinct value of the first individual-level feature.

11. The method of claim 7, wherein training the LMC model comprises tuning hyperparameters of the LMC model.

12. The method of claim 11, wherein the hyperparameters of the LMC model comprise coefficients of a coregionalization matrix, variables in kernel functions, and a covariance of noise.

13. A computer system comprising:

a processor; and a computer storage medium storing computer-useable instructions that, when used by the processor, causes the computer system to perform operations comprising:

accessing, by at least one of one or more servers of the computer system, a dataset stored on a computer storage device accessible to the computer system;

transforming, by at least one of the one or more servers of the computer system, values of individual-level features of each data instance of the dataset to generate transformed data in a higher dimensional space for each data instance;

for each distinct value of a first individual-level feature, generating, by at least one of the one or more servers of the computer system, a mean embedding using the transformed data;

training, by at least one of the one or more servers of the computer system, a Linear Model of Coregionalization (LMC) model using the mean embeddings generated from the dataset and aggregate data for the dataset;

jointly predicting, by at least one of the one or more servers of the computer system using the trained LMC model, a value for each of two or more unobserved individual-level features for a first data instance; and augmenting, by at least one of the one or more servers of the computer system, the dataset stored on the computer storage device by updating the first data instance with the value for each of the two or more unobserved individual-level features.

14. The system of claim 13, wherein the values of the individual-level features of each data instance of the dataset are transformed to generated the transformed data using a Fastfood kernel.

15. The system of claim 13, wherein the aggregate data is aggregated over each distinct value of the first individual-level feature.

* * * * *